(12) United States Patent
Chao et al.

(10) Patent No.: US 12,511,420 B2
(45) Date of Patent: Dec. 30, 2025

(54) SCALABLE ACCESS CONTROL MECHANISM

(71) Applicant: Dell Products L.P., Round Rock, TX (US)

(72) Inventors: Ching-Yun Chao, Austin, TX (US); Timothy Gilman, Cross Plains, TN (US)

(73) Assignee: Dell Products L.P., Round Rock, TX (US)

( * ) Notice: Subject to any disclaimer, the term of this patent is extended or adjusted under 35 U.S.C. 154(b) by 528 days.

(21) Appl. No.: 17/932,905

(22) Filed: Sep. 16, 2022

(65) Prior Publication Data

US 2024/0095390 A1    Mar. 21, 2024

(51) Int. Cl.
*G06F 21/00* (2013.01)
*G06F 21/62* (2013.01)

(52) U.S. Cl.
CPC .. *G06F 21/6227* (2013.01); *G06F 2221/2113* (2013.01); *G06F 2221/2141* (2013.01)

(58) Field of Classification Search
CPC ......... G06F 21/6227; G06F 2221/2113; G06F 2221/2141
See application file for complete search history.

(56) References Cited

U.S. PATENT DOCUMENTS

| | | | |
|---|---|---|---|
| 7,080,058 B1 | 7/2006 | Upadhyayula et al. | |
| 8,626,481 B1 | 1/2014 | Sundararajan et al. | |
| 10,922,423 B1 | 2/2021 | Rungta et al. | |
| 10,944,561 B1 | 3/2021 | Cahill et al. | |
| 11,023,598 B2 * | 6/2021 | Grand | G06F 21/6209 |
| 11,108,780 B2 * | 8/2021 | Cohen | G06N 3/08 |
| 11,379,275 B2 | 7/2022 | Milliron et al. | |
| 2005/0021977 A1 | 1/2005 | Oberst | |
| 2007/0289024 A1 | 12/2007 | Mohammed | |
| 2015/0379061 A1 | 12/2015 | Paraschivescu | |

(Continued)

OTHER PUBLICATIONS

Chao, Ching-Yun. "Software Services with Declarative Resource Modeling and Resource Model Patterns" U.S. Appl. No. 18/048,669, filed Oct. 21, 2022, 47 pages.

(Continued)

*Primary Examiner* — Kendall Dolly
(74) *Attorney, Agent, or Firm* — Amin, Turocy & Watson, LLP

(57) ABSTRACT

A system can maintain a first data store that stores first associations between subjects and first attributes, and a second data store that stores second associations between second attributes and permissions. The system can receive a query that identifies a user account and a resource. The system can determine, from the first data store and a context of the user account in initiating the query, first permissions for the user account with respect to the resource and given the context. The system can determine, from the second data store and the context, second permissions that are a precondition to access the resource given the context. The system can determine, based on whether there is an overlap between the first permissions and the second permissions, whether to approve the query. The system can respond to the query based on a result of the determining whether to approve the query.

20 Claims, 12 Drawing Sheets

(56) References Cited

U.S. PATENT DOCUMENTS

| | | | |
|---|---|---|---|
| 2016/0072814 A1* | 3/2016 | Martinelli | G06F 21/604 |
| | | | 726/1 |
| 2018/0349797 A1 | 12/2018 | Garvey et al. | |
| 2020/0081992 A1 | 3/2020 | Lynch et al. | |
| 2021/0084048 A1 | 3/2021 | Kannan et al. | |
| 2022/0093091 A1 | 3/2022 | Kwatra et al. | |
| 2022/0207096 A1 | 6/2022 | Salazar et al. | |
| 2022/0223143 A1 | 7/2022 | Kumar et al. | |
| 2023/0086475 A1 | 3/2023 | Mosko | |
| 2023/0401332 A1 | 12/2023 | Vahidnia et al. | |
| 2024/0179181 A1 | 5/2024 | Torlak et al. | |
| 2024/0179182 A1 | 5/2024 | Hicks et al. | |
| 2024/0179188 A1 | 5/2024 | Torlak et al. | |
| 2024/0249008 A1 | 7/2024 | Inokuchi et al. | |
| 2025/0202903 A1* | 6/2025 | Fry | H04L 63/105 |

OTHER PUBLICATIONS

"Fang, et al. "Attribute-Based Access Control Using Scoped Roles and Conditioned Permissions Dynamic Policies", U.S. Appl. No. 18/331,770, filed Jun. 8, 2023, 47 pages.".
Hu, et al. "Guide to Attribute Based Access Control (ABAC) Definition and Considerations" NIST Special Publication 800-162 [https://doi.org/10.6028/NIST.SP.800-162], Jan. 2014, 47 pages.
Ferraiolo, et al., "Extensible Access Control Markup Language (XACML) and Next Generation Access Control (NGAC)," ABAC '16: Proceedings of the 2016 ACM International Workshop on Attribute Based Access Control, Mar. 2016, 12 pages.
Ferraiolo, et al., "A Comparison of Attribute Based Access Control (ABAC) Standards for Data ServiceApplications" NIST SP 800-178, [http://dx.doi.org/10.6028/NIST.SP.800-178], Oct. 2016, 68 pages.
"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.
"Scopes" [https://auth0.com/docs/get-started/apis/scopes] retreived Nov. 3, 2023, 4 pages.
"Cortex XDR Pro Administrator Guide" [https://docs.paloaltonetworks.com/content/dam/techdocs/en_us/pdf/cortex/cortex-xdr/cortex-xdr-pro-admin/cortex-xdr-pro-admin.pdf/cortex-xdr-pro-admin.pdf], retreived Nov. 3, 2023, 776 pages.
"Attribute Based Access Control" National Institute of Standards and Technology, [https://www.nccoe.nist.gov/sites/default/files/legacy-files/abac-fact-sheet.pdf], Sep. 2017, 2 pages.
"Hierarchical and recursive queries in SQL" Wikipedia. [https://en.wikipedia.org/wiki/Hierarchical_and_recursive_queries_in_SQL#Common_table_expression], retreived Nov. 30, 2023, 5 pages.
Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.
"Hierarchical Data in SQL: The Ultimate Guide" [https://www.databasestar.com/hierarchical-data-sql/] Jun. 2, 2023, 21 pages.
"What are the options for storing hierarchical data in a relational database?" [https://stackoverflow.com/questions/4048151/what-are-the-options-for-storing-hierarchical-data-in-a-relational-database], retreived Nov. 3, 2023, 11 pages.
Monge, Alvaro. "Database design with UML and SQL, 4th edition" [https://web.csulb.edu/colleges/coe/cecs/dbdesign/dbdesign.php?page=intro.html], retrieved Nov. 3, 2023, 2 pages.
Goyal, et al. "Authorization Decisions Using Conditioned Permissions for Resource Collections" U.S. Appl. No. 18/364,939, filed Aug. 3, 2023, 53 pages.
"Jabbar et al. "Dynamic Visibility and Authorization Policymanagement for a Cloud Service Platform" U.S. Appl. No. 18/350,149, filed Jul. 11, 2023, 59 pages.".
"ACME Laboratories" [https://www.acme.com/], retrieved Dec. 1, 2023, 2 pages.
"Azure Policy definition structure" [https://learn.microsoft.com/en-us/azure/governance/policy/concepts/definition-structure], Aug. 15, 2023, 34 pages.
"Azure policyRule schema" [https://schema.management.azure.com/schemas/2020-10-01/policyDefinition.json], retrieved Dec. 1, 2023, 2 pages.
"Policy-based control for cloud native environments" Open Policy Agent. [https://www.openpolicyagent.org/], retrieved Dec. 1, 2023, 6 pages.
Sathaye, et al. "Self-Tagging", U.S. Appl. No. 18/627,118, filed Apr. 4, 2024, 43 pages.
Chao, et al. "Policy-Based Tagging Governance for Cloud Resource Lifecycle Management" U.S. Appl. No. 18/639,707, filed Apr. 18, 2024, 47 pages.
Sawal, et al. "Meta-Tagging Based Configuration Transformation for Heterogeneous Systems" U.S. Appl. No. 18/639,737, filed Apr. 18, 2024, 47 pages.
Courcelle, Bruno. "Graph equivalences and decompositions definable in Monadic Second-Order Logic. The case of Circle Graphs" presented at Proc. of ICDM, Jul. 24, 2006, 15 pages.
Thomas, Wolfgang. "Languages, Automata, and Logic" May 1996, In Handbook of Formal Languages, vol. 3: Beyond Words. New York NY: Springer-Verlag, 75 pages.
Office Action mailed Dec. 5, 2023 for U.S. Appl. No. 18/048,669, 27 pages.
Notice of Allowance mailed May 13, 2024 for U.S. Appl. No. 18/048,669, 33 pages.
Dasika, et al. "Data Center Monitoring and Management Operation Including a Data Tag Association Tracking Operation" U.S. Appl. No. 18/374,225, filed Sep. 28, 2023, 66 pages.
Guertin, et al. "Data Center Monitoring and Management Operation Including a Data Tag Management Operation" U.S. Appl. No. 18/241,030, filed Aug. 31, 2023, 73 pages.
Realegeno, et al. "User-Configurable Autotagging Policies" U.S. Appl. No. 18/241,040, filed Aug. 31, 2023, 71 pages.
Earley, et al. "Data Center Monitoring and Management Operation Including a Protected Data Tag Operation" U.S. Appl. No. 18/374,230, filed Sep. 28, 2023, 68 pages.
Sathaye, et al. "System and Methods for Dynamic Tags", U.S. Appl. No. 18/374,231, filed Sep. 28, 2023, 66 pages.
Notice of Allowance mailed Apr. 8, 2025 for U.S. Appl. No. 18/364,939, 44 pages.
Notice of Allowance mailed Apr. 10, 2025 for U.S. Appl. No. 18/331,770, 36 pages.
Office Action mailed May 29, 2025 for U.S. Appl. No. 18/627,118, 24 pages.
Office Action mailed Nov. 3, 2025 for U.S. Appl. No. 18/639,737, 125 pages.

* cited by examiner

300

ENTITY TYPE 304

| PARTNER MODEL 306 | DISTRIBUTOR 308 | SOLUTION PROVIDER (RESELLER) 310 | SOLUTION PROVIDER (TIER 1) 312 | CSP/SI (TIER 1) 314 | CHANNEL CUSTOMER 316 | DIRECT CUSTOMER 318 |
|---|---|---|---|---|---|---|
| VIEW CATALOG | YES | YES | YES | YES | YES | YES |
| CONFIGURE DRAFT ORDER | YES | NO | YES | YES | NO | YES |
| VIEW PRICING/BILLING | YES | NO | YES | YES | NO | YES |
| VIEW TERMS | YES | YES | YES | YES | YES | YES |
| VIEW SUBSCRIPTION AND METRICS | YES | YES | YES | YES | YES | YES |
| SERVICE REQUESTS; VIEW MGMT IAM; VIEW | YES | YES | YES | YES | YES | YES |
| HARDWARE ASSET, OS, PLATFORM MANAGEMENT | YES/NO | NO | YES | YES/YES | NO | NO |
| APPLICATION MANAGEMENT | YES | NO | YES | YES/YES | NO | YES |
| WORKLOAD MANAGEMENT | YES | NO | YES | YES/NO | YES | YES |

ACCESS TYPE 302

DEPICTS PERFORMING SUBSEQUENT OPERATIONS AS ONE DATA STORE ACCESS OF THE FIRST DATA STORE 804

↓

REMOVING A SECOND USER ACCOUNT FROM AT LEAST ONE GROUP IN THE FIRST DATA STORE 806

↓

REMOVING THE SECOND USER ACCOUNT FROM THE FIRST DATA STORE 808

SCALABLE ACCESS CONTROL MECHANISM

BACKGROUND

Access control mechanisms can be implemented on computer systems to facilitate only authorized user accounts in accessing resources of the computer systems.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a first data store that stores first associations between subjects and first attributes. The system can maintain a second data store that stores second associations between second attributes and permissions. The system can receive a query that identifies a user account and a resource, wherein the query indicates querying whether the user account has permission to access the resource. The system can determine, from the first data store and a context of the user account in initiating the query, first permissions for the user account with respect to the resource and given the context. The system can determine, from the second data store and the context of the user account in initiating the query, second permissions that are a precondition to access the resource given the context. The system can determine, based on whether there is an overlap between the first permissions and the second permissions, whether to approve the query. The system can respond to the query based on a result of the determining whether to approve the query.

An example method can comprise receiving, by a system comprising a processor, a query that identifies a user account and a resource, and wherein the query indicates querying whether the user account is authorized to access the resource. The method can further comprise determining, by the system and from a database that stores first associations between subjects and first attributes, user attributes that correspond to the user account, and resource attributes that correspond to the resource. The method can further comprise determining, by the system and from the user attributes and resource attributes and from a context in which the query was initiated, first permissions for the user account with respect to the resource and given the context, and second permissions that enable access to the resource given the context. The method can further comprise determining, by the system and based on the first permissions and the second permissions, whether to approve the query. The method can further comprise responding, by the system, to the query based on the determining whether to approve the query.

An example non-transitory computer-readable medium can comprise instructions that, in response to execution, cause a system comprising a processor to perform operations. These operations can comprise receiving a query that identifies a user account and a resource. These operations can further comprise determining, from a storage device that stores first associations between subjects and first attributes, user attributes that correspond to the user account, and resource attributes that correspond to the resource. These operations can further comprise determining, from the user attributes and the resource attributes, and from a context in which the query was initiated, first permissions for the user account with respect to the resource and second permissions that are a prerequisite to access the resource. These operations can further comprise determining, based on the first permissions and the second permissions, whether to approve the query.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example table of visibility and access of resources for which access can be determined, and that can facilitate a scalable access control mechanism, in accordance with an embodiment of this disclosure;

FIG. 8 illustrates another example process flow that can facilitate a scalable access control mechanism, in accordance with an embodiment of this disclosure;

DETAILED DESCRIPTION

Overview

Figure 1:
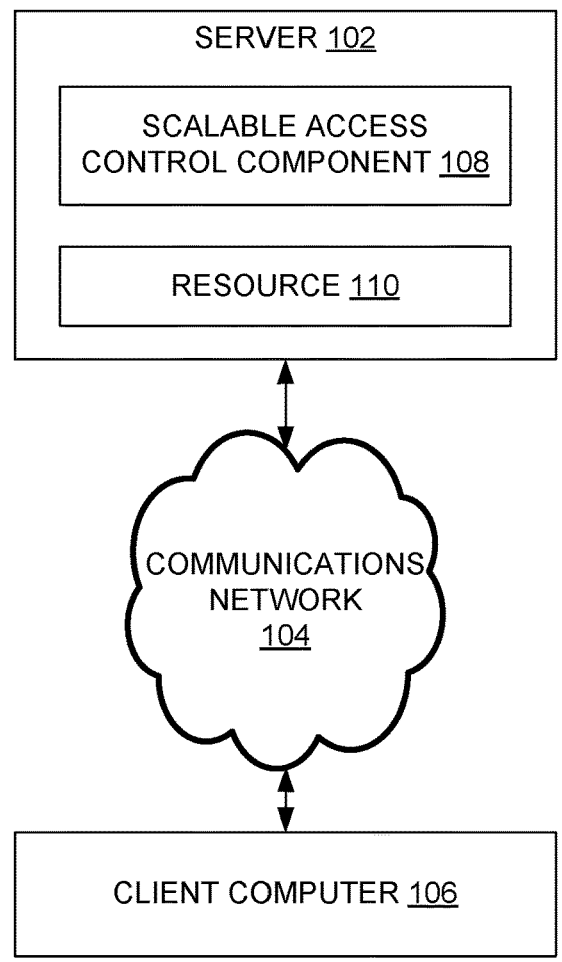
FIG. 1 illustrates an example system architecture that can facilitate a scalable access control mechanism, in accordance with an embodiment of this disclosure.

Role Based Access Control (RBAC) can comprise an access control mechanism to manage access to protected resources. Other access control mechanisms can include Discretionary Access Control (DAC) and Mandatory Access Control (MAC). A DAC model can permit resource owners to assign access rights leveraging approaches like access control lists (ACLs). A MAC model access control policy decision can be made by a central authority, rather than by resource owners. RBAC can be suitable for cases with a limited number of roles/permissions, simple organization hierarchy, and simple resources relationship. Access control configuration can be simple, and access control decision can be efficiently determined. When an organization size grows with more a complex organization hierarchy, it can be that a RBAC configuration becomes too complex to manage. It can be necessary to implement custom logic necessary to handle more complex organization and resource hierarchy and relationship constraints.

A RBAC model can specify what role(s)/permission(s) a subject must have to perform an action on an object (e.g., a resource). In an example, initially a platform can use RBAC mechanism to handle direct user access of their resources' access control requirements. Users can be assigned one or more roles that permits them to access resources that their organization owns. It can be that this is not a pure role-based access control model because the access control decision is made based on resource ownership. However, the extra step to determine resource ownership can be straightforward to handle.

An example where a cloud service provider project adds support to channel partner resale usage scenarios, it can become apparent that a RBAC mechanism is not sufficient. Channel customers can order cloud service provider subscriptions through distributor channel resellers where resources are "owned" by distributors while channel partners have right to use the resources. Distributors can "own" the resources in the sense that distributors own the management, service and support, and billing and invoicing of those resources. Access permissions granted to users of channel customers and to users of direct customers can be different. Moreover, a customer can order subscription directly from the cloud service provider, from distributors, or from both. This can mean that access control decisions can be determined based on many factors such as type of customers (e.g., channel v. direct), a user's organization (e.g., end customer, reseller, or distributor), and accessible resources (e.g., which organization owns resources and what is the relationship between a user and the owning organization). A new access control mechanism can be needed to handle this complexity.

There can be alternate approaches. One approach, an Attribute Based Access Control (ABAC) mechanism, can comprise an access control mechanism where subject requests to perform operations on objects can be granted or denied based on assigned attributes of the subject, assigned attributes of the object, environment conditions, and/or a set of policies that are specified in terms of those attributes and conditions. Currently, it can be that there is no comprehensive access control framework that can resolve the access control requirements of complex and large-scale business management scenarios.

Another approach can comprise a Scope Based Access Control (SBAC) mechanism, and it can have variations. A scope-based access control mechanism can be implemented to permit an administrator to restrict a Device Manager role to a subset of device groups called scope. That is, a scope can define a set of resources. In other examples, scope can be used to define specific actions (e.g., permissions) that can be applied. That is, a notion of scope can be applied to specify a set of permissions.

Where scoping is used in access permissions, it can be that scope has to be applied to either a subject or to an object. That is, it can be that there is no single, complete, unified, and consistent architecture design that can satisfy general complex business management access control requirements. Applying these ad-hoc solutions can result in access control mechanisms that are complex, hard to manage, and hard to scale.

In contrast, the present techniques can be implemented to provide for a holistic and complete architecture design and implementation that meets access control requirements of complex business management systems, and that is easy to manage and scalable.

The present techniques can be implemented to facilitate optimized performance, and simplified management on top of an attribute-based control architecture that can scale to next generation asset deployment, and consumer and partner size.

In some examples, the scale and complexity of next generation business management access control scenarios require more than RBAC techniques can deliver. An ABAC architecture can be implemented to build a policy driven access control method that dynamically evaluates attributes of subject, object, and contextual data to make and enforce access control decision to tackle the scale of next generation business management systems. However, an ABAC architecture's high-level goal of developing a set of policies that are specified in terms of those attributes and conditions likely lead to overly complex policy language and increasing management complexity.

Some entities implement SBAC approaches to enhance RBAC in various ways.

From RBAC, ABAC, and SBAC techniques, it can be that there is no single, complete, unified, and consistent architecture design according to the prior approaches that can satisfy general complex business management access control requirements.

The primary example used herein relates to cloud management project usage scenarios and requirements. It can be appreciated that the present techniques can be applied to a variety of scenarios, including complex business management scenarios.

Example Architectures and Table

FIG. 1 illustrates an example system architecture 100 that can facilitate a scalable access control mechanism, in accordance with an embodiment of this disclosure.

System architecture 100 comprises server 102, communications network 104, and client computer 106. In turn, server 102 comprises scalable access control component 108 and resource 110.

Figure 12:
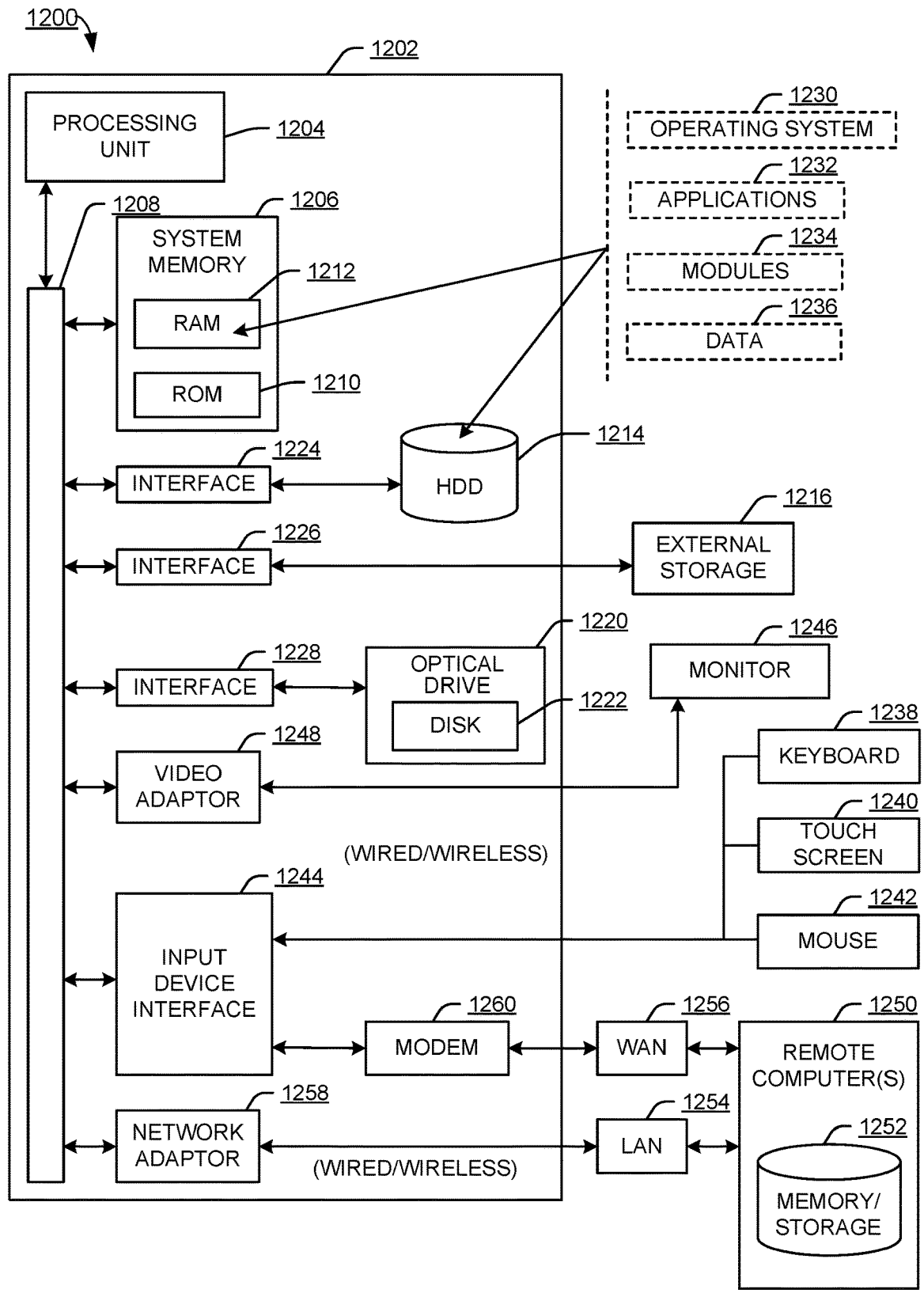
FIG. 12 illustrates an example block diagram of a computer operable to execute an embodiment of this disclosure.

Each of server 102 and/or client computer 106 can be implemented with part(s) of computing environment 1200 of FIG. 12.

Server 102 can maintain resources (e.g., resource 110), such as files to read to or write from, or database records to modify. Client computer 106 can communicate with server 102 via communications network 104 to request access to resource 110. To determine whether to permit access to resource 110 to client computer 106, scalable access control component 108 can evaluate the request, which can be a type of query. Based on the determination by scalable access control component 108, access to resource 110 by client computer 106 can be allowed or denied.

In some examples, scalable access control component 108 can implement part(s) of the process flows of FIGS. 6-11 to implement a scalable access control mechanism.

It can be appreciated that system architecture 100 is one example system architecture for a scalable access control mechanism, and that there can be other system architectures that facilitate a scalable access control mechanism.

Figure 2:
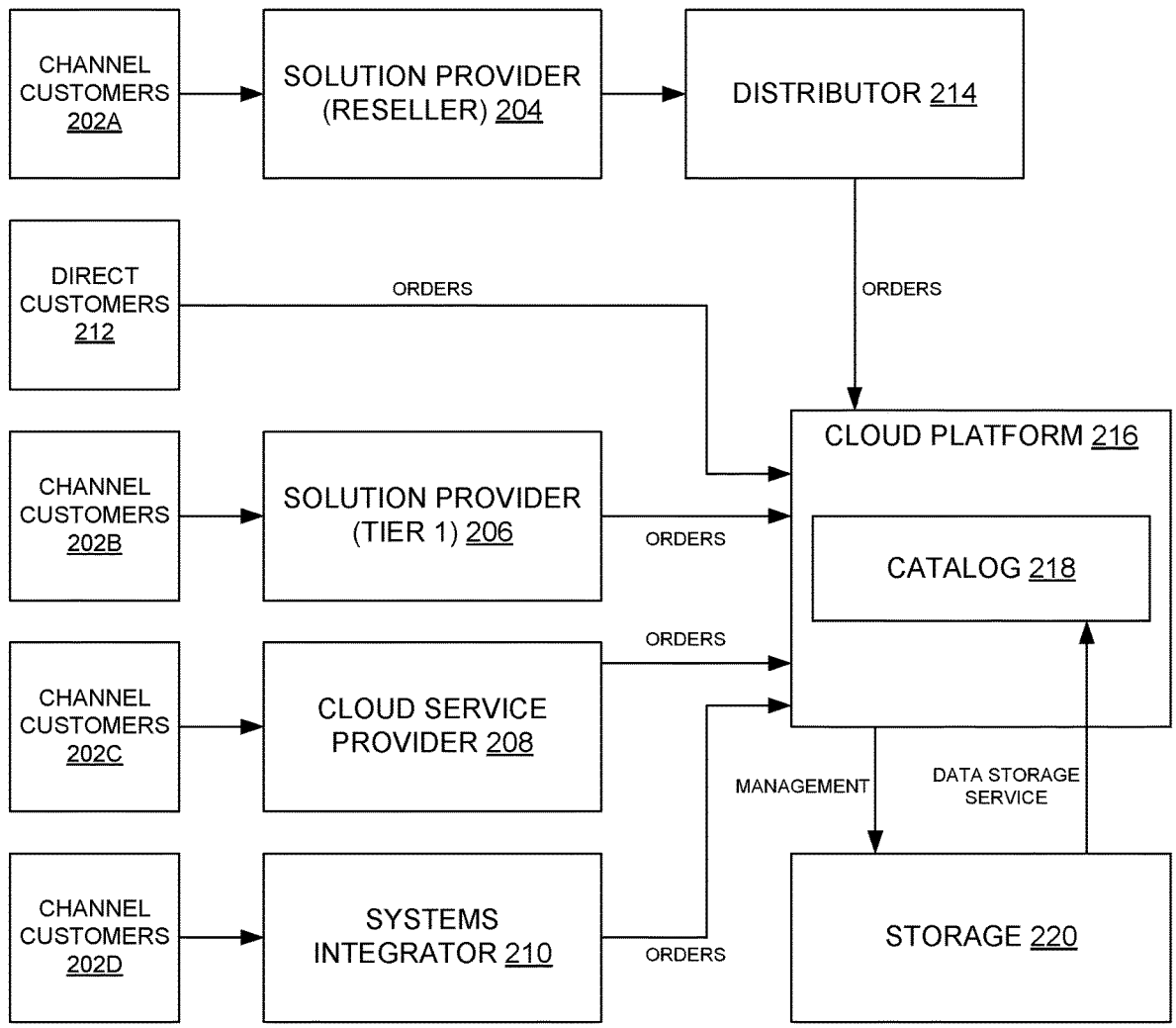
FIG. 2 illustrates an example system architecture of a hierarchy of user entities for which access can be determined, and that can facilitate a scalable access control mechanism, in accordance with an embodiment of this disclosure.

FIG. 2 illustrates an example system architecture 200 of a hierarchy of user entities for which access can be determined, and that can facilitate a scalable access control mechanism, in accordance with an embodiment of this disclosure. In some examples, part(s) of system architecture 200 can be implemented by part(s) of system architecture 100 of FIG. 1 to facilitate a scalable access control mechanism.

System architecture 200 comprises channel customers 202A, channel customers 202B, channel customers 202C, channel customers 202D, channel customers 202E, solution provider (reseller) 204, solution provider (tier 1) 206, cloud service provider 208, systems integrator 210, direct customers 212, distributor 214, cloud platform 216, catalog 218, and storage 220.

Each of channel customers 202A, channel customers 202B, channel customers 202C, channel customers 202D, channel customers 202E, and direct customers 212 can be entities that can request access to a resource, such as cloud computing resources provided by cloud platform 216 (e.g., accessing storage and compute resources provided by cloud platform 216).

Solution provider (reseller) 204, solution provider (tier 1) 206, cloud service provider 208, systems integrator 210, and distributor 214 can comprise entities that are authorized to sell, or otherwise make available, access to computing resources of cloud platform 216 to channel customers 202A, channel customers 202B, channel customers 202C, channel customers 202D, channel customers 202E, and direct customers 212.

Catalog 218 can store indications of resources offered by cloud platform 216. Cloud platform 216 can actively manage storage resources of storage 220 (and make them available to user accounts).

System architecture 200 illustrates an example cloud service provider project channel partner, channel customer, and direct customer hierarchy. A scalable access control mechanism according to the present techniques can be implemented on this hierarchy to provide access control to resources.

FIG. 3 illustrates an example table 300 of visibility and access of resources for which access can be determined, and that can facilitate a scalable access control mechanism, in accordance with an embodiment of this disclosure. In some examples, part(s) of table 300 can be implemented by part(s) of system architecture 100 of FIG. 1 to facilitate a scalable access control mechanism.

Table 300 comprises access type 302 as rows, and entity type 304 as columns. In turn, entity type 304 comprises partner model 306, distributor 308, solution provider (reseller) 310, solution provider (tier 1) 312, cloud service provider (CSP)/systems integrator (SI) 314, channel customer 316, and direct customer 318.

For each identified access type in access type 302, table 300 identifies whether that access type is permitted for the various entities identified in columns of entity type 304.

That is, table 300 identifies visibility and accessibility (within scope) of resources to partners and customers.

Figure 4:
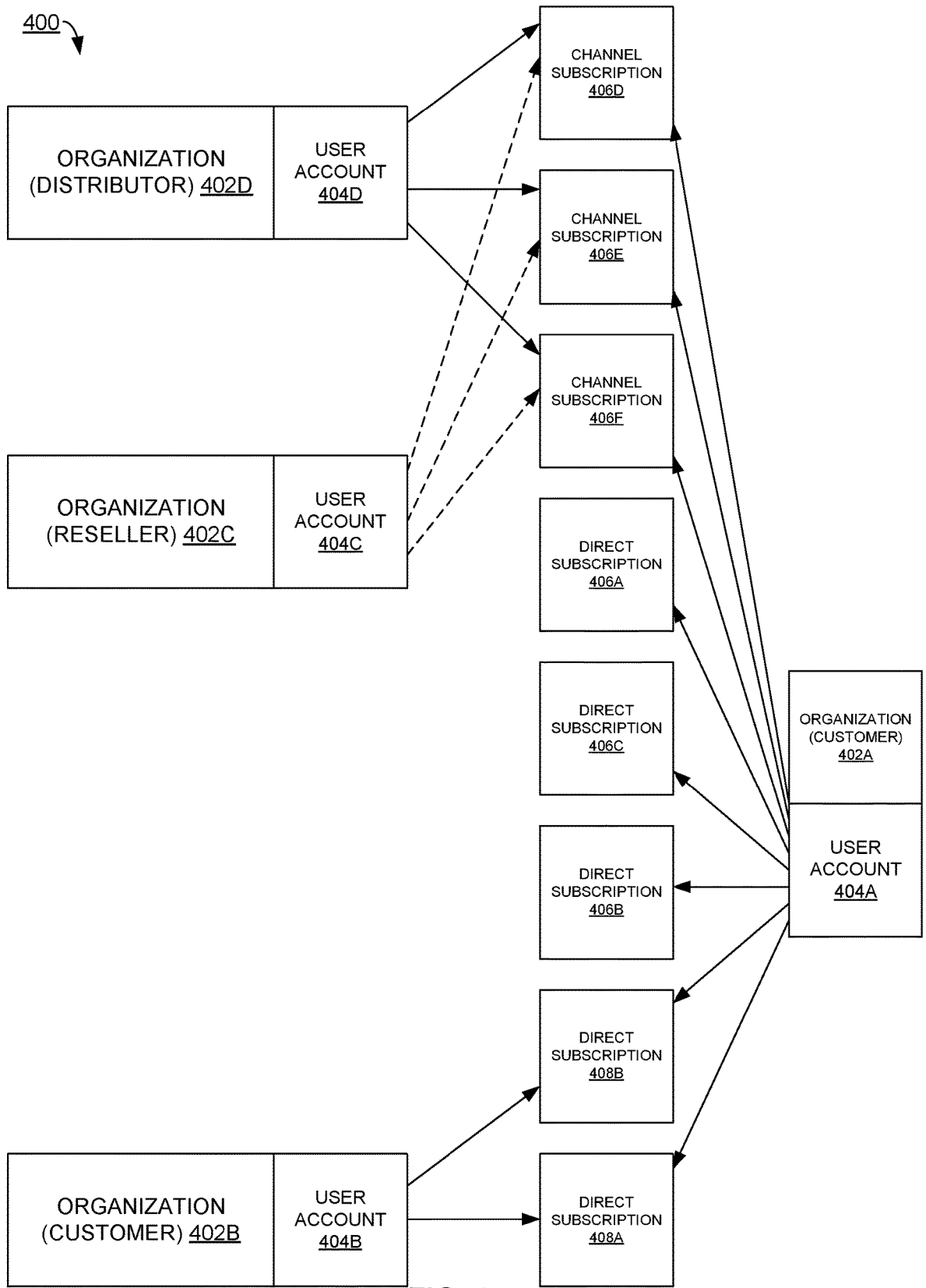
FIG. 4 illustrates another example system architecture of a hierarchy of user entities for which access can be determined, and that can facilitate a scalable access control mechanism, in accordance with an embodiment of this disclosure.

FIG. 4 illustrates another example system architecture 400 of a hierarchy of user entities for which access can be determined, and that can facilitate a scalable access control mechanism, in accordance with an embodiment of this disclosure. In some examples, roles and permissions of entities in system architecture 400 can be evaluated by scalable access control component 108 of FIG. 1 to determine whether to permit access to a resource.

System architecture 400 uses an example to illustrate a relationship of a customer with a cloud service provider, with distributor channel partners, and with another customer. This figure also illustrates resource visibility and accessibility to users of the distributor partners and the two new customers. In this example, user 1 has visibility and accessibility to all resources, although with restricted permissions given various relationships.

System architecture 400 can illustrate both scoping aspects of typical non-trivial enterprise business management systems. A user's visibility and accessibility to resources and actions that a user can perform on those resources can be determined by various relationships that a user has with other organizations, relationships with owners with resources in the system, contracts on subscriptions and resources, resource physical location, and other environmental factors like time of day, etc.

As depicted, system architecture 400 comprises organization 402A, organization 402B, organization 402C, and organization 402D, where each organization can comprise users that have roles. Organization 402A and organization 402B are customers; organization 402C is a reseller; and organization 402D is a distributor.

Organization 402A, organization 402B, organization 402C, and organization 402D can comprise user account 404A, user account 404B, reseller account 404C, and distributor account 404D, respectively.

Direct subscription 406A, direct subscription 406B, direct subscription 406C, channel subscription 406D, channel subscription 406E, channel subscription 406F, direct subscription 408A, and direct subscription 408B can comprise different subscriptions that user account 404A, user account 404B, reseller account 404C, and distributor account 404D can subscribe to.

In system architecture 400, the following can be true. Distributor account 404D can see channel subscription 406D, channel subscription 406E, and channel subscription 406F, but not associated customer data. Reseller account 404C cannot see billing or customer data for channel subscription 406D, channel subscription 406E, and channel subscription 406F. User account 404B cannot see billing information for channel subscription 406D, channel subscription 406E, channel subscription 406F, but can see associated services and data. User account 404B can access and manage direct subscription 406A, direct subscription 406B, direct subscription 406C, direct subscription 408A, and direct subscription 408B. User account 404A can access and manage direct subscription 408A, and direct subscription 408B.

The following examples can illustrate various sets of resources that can be visible to user account 404A, and corresponding permissions that user account 404A has in each case.

To be more specific, the below examples illustrate various sets of resources that are visible and accessible to user account 404A and the permissions user account 404A has in each case.

In one example, user account 404A can see all resources of direct subscription 406A, direct subscription 406B, and direct subscription 406C. This is because user account 404A is a user of organization 402A who owns those three subscriptions as a direct customer of the cloud service provider. A direct customer can have all permissions to direct subscriptions. User account 404A in this case can have all permissions. What permissions user account 404A has can be determined by roles granted to user account 404A.

In another example, user account 404A can see resources of direct subscription 406A and direct subscription 406B. Organization 402B owns direct subscription 406A and direct subscription 406B, not organization 402A. However, user account 404A is also a user of organization 402B.

This can happen when organization 402B add user account 404A to its user list. A reason for doing that can vary. One possible case can be where user account 404A is doing contractual work for organization 402B and is delegated to work on direct subscription 408A and direct subscription 408B. Then, the exact list of permissions user account 404A has on resources of direct subscription 408A and direct subscription 408B can depend on what roles organization 402A grants to user account 404A.

In another example, user account 404A has visibility and accessibility to resources of channel subscription 406D, channel subscription 406E, and channel subscription 406F because organization 402A ordered those subscriptions through organization 402C (a reseller) from organization 402D (a distributor). As a channel customer, it can be that organization 402A does not have all permissions to those subscriptions. For example, organization 402A does not have permission to see pricing data, billing data, and invoicing data of those subscriptions. User account 404A permissions can be further restricted by organization 402A depending on what roles organization 402A grants to user account 404A.

In another example, organization 402D (a distributor) owns channel subscription 406D, channel subscription 406E, and channel subscription 406F. However, organization 402A owns the right to use the resources of those subscriptions and ownership of business data on those resources. It can be that users of organization 402D are not to be granted permission to access such business data.

In another example, organization 402C (a reseller) does not own channel subscription 406D, channel subscription 406E, and channel subscription 406F. It can be that users of organization 402C are not allowed to see pricing data, billing data, invoicing data, nor business data. Users of organization 402C can access usage data and metric data when grant required roles by organization 402C.

In another example, users of organization 402D (a distributor) and organization 402C (a reseller) are not to be permitted visibility and accessibility to direct subscription 406A, direct subscription 406B, and direct subscription 406C, unless if such users are added to user list by organization 402A. Similarly, it can be that users of organization 402D and organization 402C are not to be permitted visibility and accessibility to direct subscription 408A and direct subscription 408B, unless if such users are added to user list by organization 402B.

Figure 5:
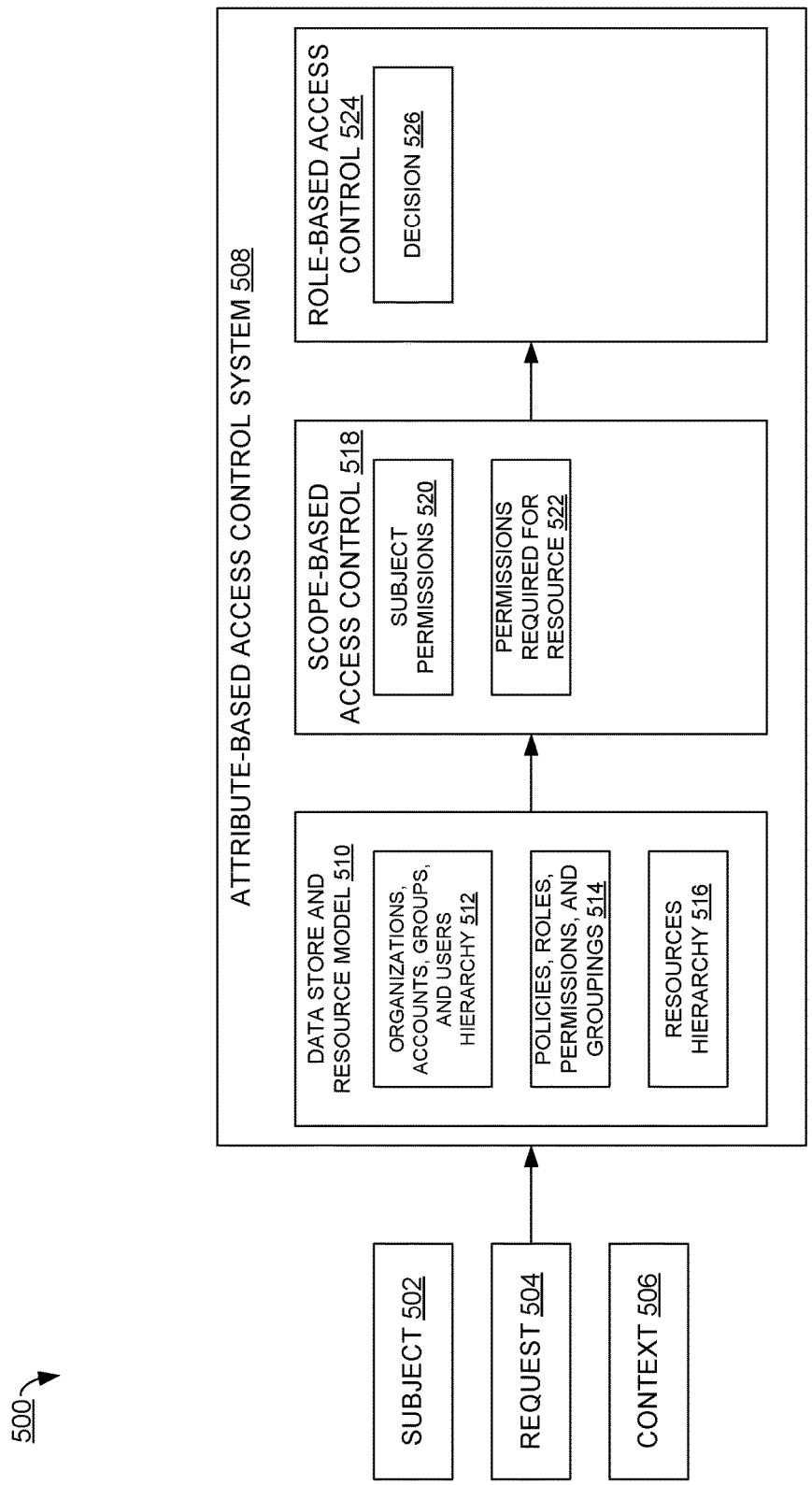
FIG. 5 illustrates another example system architecture that can facilitate a scalable access control mechanism, in accordance with an embodiment of this disclosure.

FIG. 5 illustrates another example system architecture 500 that can facilitate a scalable access control mechanism, in accordance with an embodiment of this disclosure. In some examples, part(s) of system architecture 500 can be implemented by part(s) of system architecture 100 of FIG. 1 to facilitate a scalable access control mechanism.

System architecture 500 comprises subject 502, request 504, context 506, and attribute-based access control system 508. In turn, attribute-based access control system 508 comprises data store and resource model 510, scope-based access control 518, and role-based access control 524.

Data store and resource model 510 comprises organizations, accounts, groups, and users hierarchy 512; policies, roles, permissions, and groupings 514; and resources hierarchy 516. Scope-based access control 518 subject permissions 520 and permissions required for resource 522. Role-based access control 524 comprises decision 526.

Subject 502 can identify a user account, such as via an email address. Request 504 can identify a request to access a resource by subject 502, such as whether subject 502 can access resource A1234YP99 to delete it. Context 506 identifies context in which request 504 is made, such as what account or subscription subject 502 chose to use, what organization(s) subject 502 is under, when the request is made, where the request is made (e.g., an Internet Protocol (IP) address, a country, or a region), and how the request is made.

Organizations, accounts, groups, and users hierarchy 512 can comprise information about those entities and their various attributes. Policies, roles, permissions, and groupings 514 can comprise information about what resource access different entities can make. Resources hierarchy 516 can comprise information about those entities and their various attributes.

Subject permissions 520 comprises a partial answer to request 504. Subject permissions answers what roles and/or permissions does subject 502 have with respect to the requested resource under context 506. Permissions required for resource 522 comprises a partial answer to request 504. Permissions required for resource 522 answers what roles and/or permissions the requested resource requires subject 502 to have under context 506. Decision 526 combines the partial answers of subject permissions 520 and permissions required for resource 522 to determine whether to allow request 504. Decision 526 can accomplish this by determining whether there is overlap between subject permissions 520 and permissions required for resource 522. Where there is overlap, request 504 can be allowed, and where there is not overlap request 504 can be denied.

System architecture can demonstrate some considerations involved in access control usage scenarios. System architecture 500 can illustrate an architectural design and building blocks of an example access control mechanism and framework. This access control framework can take user, organization, subscriptions, resources, and other context information as inputs evaluating and producing a YES or NO access control decision. This access control framework can contain a pipeline of three units from beginning to end: data store and resource model 510, scope-based access control 518, and role-based access control 524.

An objective of attribute-based access control system 508 can be to organize subject type of data, organization hierarchical type of data, and object type of data to facilitate highly efficient query and management operations. Attribute-based access control system 508 can generally be considered to be a data model optimization unit.

Attribute-based access control system 508 can be viewed as an access control policy enforcement point. The policy in other approaches can be formulated to evaluate access control decisions, which makes such a policy overly complex to manage and to validate. In contrast, a strength of an attribute-based process can be data modeling for optimal data processing performance. A design according to the present techniques can leverage a strength of attribute-based access control system 508 to optimize an access control data model. That is, attribute-based access control system 508 can be utilized to select subject, object, and organization relationship data based on input information and contextual information. A result can then be fed to a subsequent scope-based access control unit to determine a scope of roles and permissions and the scope of physical and virtual assets.

Consider an example with a Lightweight Directory Access Protocol (LDAP) that illustrates data modeling and performance optimization aspects of an ABAC approach. Initially, a LDAP can organize group and user hierarchical organization via a containment relationship. That is, initially a LDAP server can organize a user group as a container of users. This can be convenient of searching for user members of a group. However, searching for all groups for which a user is a member can be slow. It can be that one needs to search all groups to determine whether the user is a member.

From that can come a notion of a dynamic group, which can take an approach of making group membership a user attribute. Consider a case of a LDAP server that user a relational database to store its persistent data. This attribute-based approach significantly improves search (query) performance. Both searching on whether a user is a member of a group, and searching for all of the groups where the user is a member can be performed with a single ow access. Searching for all user members of a given group can be similarly efficient.

Moreover, modeling a containment relationship via an attribute can also significantly improve management performance. For example, adding a new user and then adding the user to a list of groups can be done in a single database access, when using attributed-based approach. When a user leaves or move on to new responsibilities, removing the user from all those groups can also be performed with a single database access. In contrast, with a containment relationship, adding users to groups and removing users from groups can require modifying all those groups.

Treating attribute-based-access control as a data model optimization step can work to convert a complex policy evaluation and management problem into a well understood data modeling problem, and eliminate the complexity of a policy management problem.

With the present techniques, using attribute-based-access control as data modeling optimization unit can leverage a strength of attributed-based data modeling optimization, while avoiding attributed policy management complexity and policy evaluation computation overhead.

Scope-based access control 518 can take a query result from data store and resource model 510 to determine the scope of permissions a user has, and the scope of objects a user has visibility and accessibility to. In some examples, the policy for determining the scopes can be formulated using IF . . . THEN logic expressions. Consider the following examples to demonstrate the rules.

First, on a role/permission scope-based access control side (e.g., subject permissions 520):
1. If an administrative user is in the context of a channel customer, then remove billing type of permissions from the administrator role this user has.
2. If a regular user is in the context of a channel customer of a cloud service provider, then remove a hardware management type of permissions from the regular user role this user has.

Next on an object scope-based access control side (e.g., permissions required for resource 522):
1. If a regular user is in the context of a channel customer of a given distributor, then remove subscriptions and related assets that are not owned by the specified distributor.

The implementation of these rules can be realized using filtering techniques. Resulting scoped permissions and scoped set of objects can be fed to role-based access control 524. Role-based access control 524 can function to evaluate whether the user has the required permission to perform the specified action on specified object(s) in the scope. In some examples, a role-based access control policy can be realized as a two-dimension table, and a decision can be determined via a table lookup.

A novelty and advantage of a scope-based access control 518 and role-based access control 524 approach according to the present techniques can be to formulate complex access control policy requirements as a simpler and well-understood group of policy statements and implementations.

In summary, the present techniques can use a three stage (data store and resource model 510, scope-based access control 518, and role-based access control 524) pipeline line approach to realize the potential of attribute-based access control capability to handle next generation large scale of business management complexity. By decomposing the architecture design to data model optimization, followed by contextual data driven permissions and objects scoping, and then well-understood role-based access control decision making and enforcement, the present techniques can function to covert a complex attribute-based access control policy into well-understood scoping rules and role-based permission table lookups.

Put another way, attribute-based access control system 508 can be decomposed into three subsystems: (1) data store and resource model 510, which can comprise a resource modeling system design problem that optimize attribute based search; (2) scope-based access control 518, which can comprise a scope-based access control system design that scopes roles and/or permissions a subject has under the context, and a resource required under the context; and (3) role-based access control 524, which can comprise a role-based access control system design that use the scoped roles and permissions to make an authorization decision.

An attribute-based access control mechanism can comprise an access control method where subject requests to perform operations on objects can be granted or denied based on assigned attributes of a subject, assigned attributes of an object, environment conditions, and a set of policies that are specified in terms of those attributes and conditions. Here, policies can be applied in a scoped-based access control system to form partial answers based on the attributes and environment conditions in the context.

Example Process Flows

Figure 6:
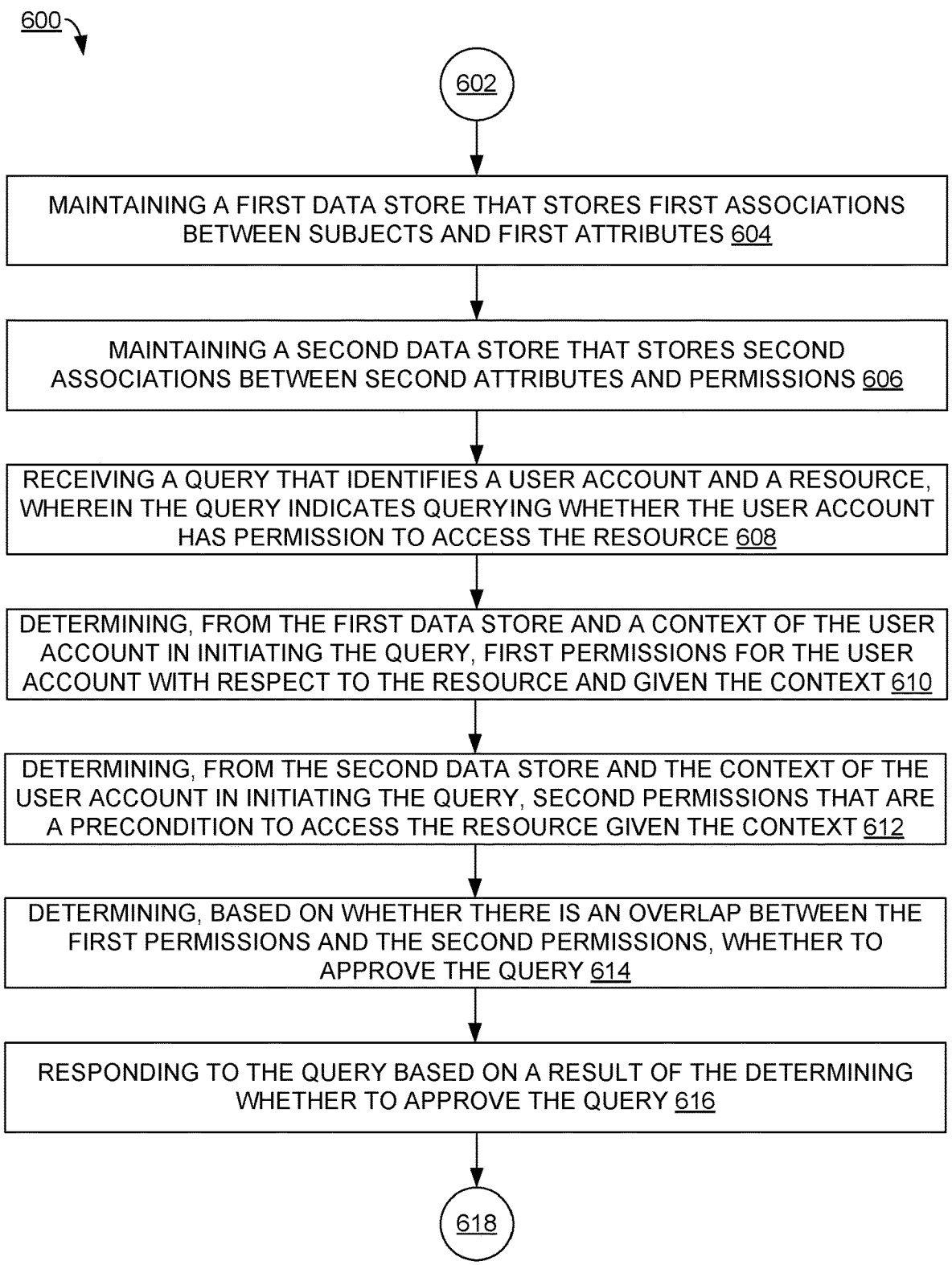
FIG. 6 illustrates an example process flow that can facilitate a scalable access control mechanism, in accordance with an embodiment of this disclosure.

FIG. 6 illustrates an example process flow 600 that can facilitate a scalable access control mechanism, in accordance with an embodiment of this disclosure. In some examples, one or more embodiments of process flow 600 can be implemented by scalable access control component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts maintaining a first data store that stores first associations between subjects and first attributes. In some examples, the first data store can be similar to a portion of data store and resource model 510 of FIG. 5 that stores organizations, accounts, groups, and users hierarchy 512.

After operation 604, process flow 600 moves to operation 606.

Operation 606 depicts maintaining a second data store that stores second associations between second attributes and permissions. In some examples, the first data store can be similar to a portion of data store and resource model 510 of FIG. 5 that stores policies, roles, permissions, and groupings 514.

After operation 606, process flow 600 moves to operation 608.

Operation 608 depicts receiving a query that identifies a user account and a resource, wherein the query indicates querying whether the user account has permission to access the resource. This query can be a database query formed based on request 504 of FIG. 5, and that identifies subject 502 as the user account, and a resource that subject 502 is attempting to access.

After operation 608, process flow 600 moves to operation 610.

Operation 610 depicts determining, from the first data store and a context of the user account in initiating the query, first permissions for the user account with respect to the resource and given the context. In some examples, this can be performed by subject permissions 520 of FIG. 5, where the context is similar to context 506.

After operation 610, process flow 600 moves to operation 612.

Operation 612 depicts determining, from the second data store and the context of the user account in initiating the query, second permissions that are a precondition to access the resource given the context. In some examples, this can be performed by permissions required for resource 522 of FIG. 5, where the context is similar to context 506.

After operation 612, process flow 600 moves to operation 614.

Operation 614 depicts determining, based on whether there is an overlap between the first permissions and the second permissions, whether to approve the query. In some examples, this can be performed by decision 526 of FIG. 5.

In some examples, the first data store is configured as part of an organization and resource model process. In some examples, the second data store is configured as part of a scope-based access control process. In some examples, the determining whether to approve the query is performed as part of a role-based access control process. That is, an attribute based access control system (such as attribute-based access control system 508 of FIG. 5) can comprise an organizational/resource model, a scope based access control component, and a role based access control component.

After operation 614, process flow 600 moves to operation 616.

Operation 616 depicts responding to the query based on a result of the determining whether to approve the query. In some examples, this can be performed by attribute-based access control system 508 of FIG. 5.

After operation 604, process flow 600 moves to 618, where process flow 600 ends.

Figure 7:
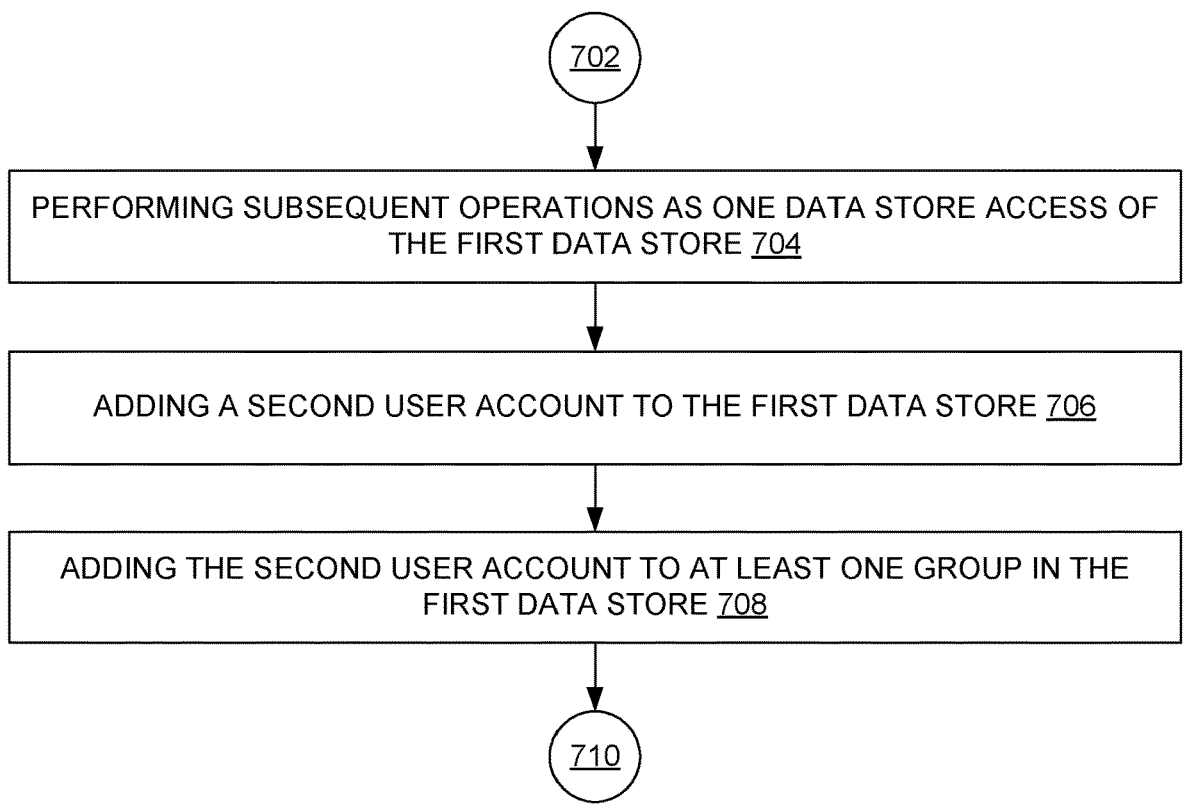
FIG. 7 illustrates another example process flow that can facilitate a scalable access control mechanism, in accordance with an embodiment of this disclosure.

FIG. 7 illustrates an example process flow 700 that can facilitate a scalable access control mechanism, in accordance with an embodiment of this disclosure. In some examples, one or more embodiments of process flow 700 can be implemented by scalable access control component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts performing subsequent operations as one data store access of the first data store. That is, adding a new user (operation 706) and then adding the user to a list of groups (operation 708) can be performed in a single database access according to an attribute-based approach.

After operation 704, process flow 700 moves to operation 706.

Operation 706 depicts adding a second user account to the first data store.

After operation 706, process flow 700 moves to operation 708.

Operation 708 depicts adding the second user account to at least one group in the first data store.

After operation 708, process flow 700 moves to 710, where process flow 700 ends.

FIG. 8 illustrates an example process flow 800 that can facilitate a scalable access control mechanism, in accordance with an embodiment of this disclosure. In some examples, one or more embodiments of process flow 800 can be implemented by scalable access control component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts performing subsequent operations as one data store access of the first data store. That is, removing a user (operation 808) and also removing the user from groups from which it is a member (operation 806) performed in a single database access according to an attribute-based approach.

After operation 804, process flow 800 moves to operation 806.

Operation 806 depicts removing a second user account from at least one group in the first data store.

After operation 806, process flow 800 moves to operation 808.

Operation 808 depicts removing the second user account from the first data store.

After operation 808, process flow 800 moves to 810, where process flow 800 ends.

Figure 9:
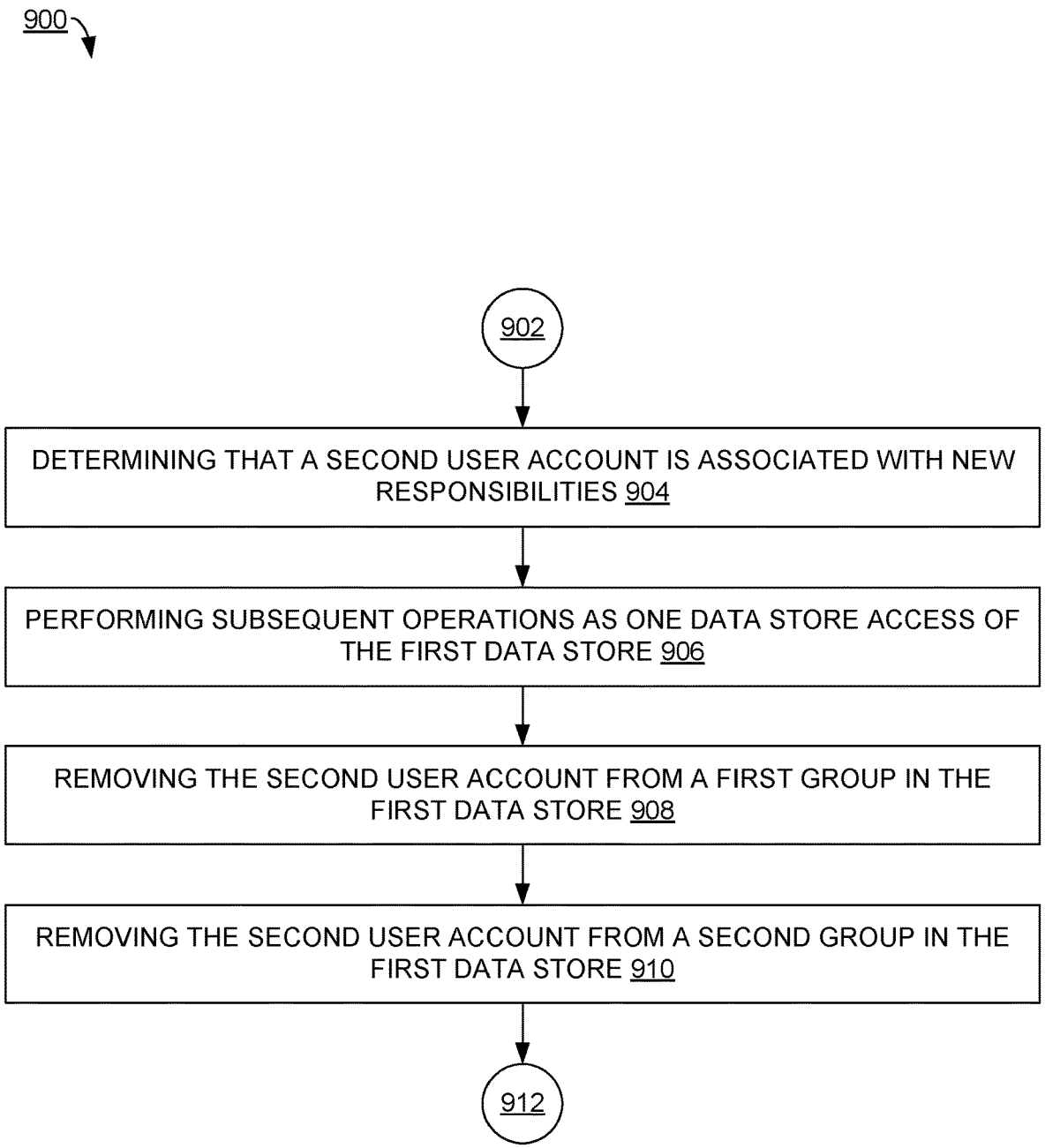
FIG. 9 illustrates an example process flow that can facilitate a scalable access control mechanism, in accordance with an embodiment of this disclosure.

FIG. 9 illustrates an example process flow 900 that can facilitate a scalable access control mechanism, in accordance with an embodiment of this disclosure. In some examples, one or more embodiments of process flow 900 can be implemented by scalable access control component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts determining that a second user account is associated with new responsibilities. That is, in contrast to deleting a user (as in process flow 800 of FIG. 8), in process flow 900, a user's role can change, and this can be determined in operation 904.

After operation 904, process flow 900 moves to operation 906.

Operation 906 depicts performing subsequent operations as one data store access of the first data store. That is, removing a user from one group (operation 908) and also removing the user from another group (operation 910) performed in a single database access according to an attribute-based approach.

After operation 906, process flow 900 moves to operation 908.

Operation 908 depicts removing the second user account from a first group in the first data store.

After operation 908, process flow 900 moves to operation 910.

Operation 910 depicts removing the second user account from a second group in the first data store.

After operation 910, process flow 900 moves to 912, where process flow 900 ends.

Figure 10:
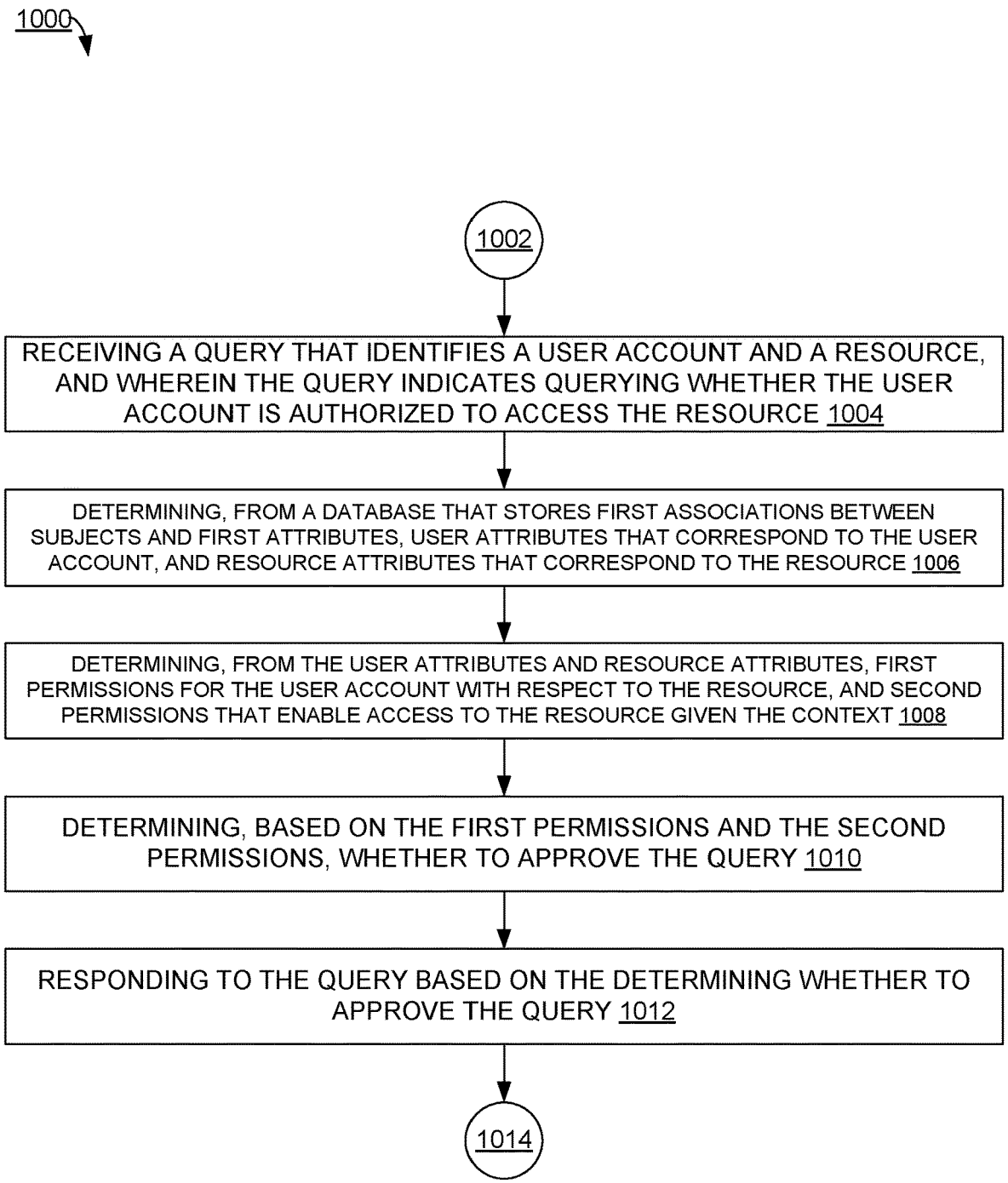
FIG. 10 illustrates another example process flow that can facilitate a scalable access control mechanism, in accordance with an embodiment of this disclosure.

FIG. 10 illustrates an example process flow 1000 that can facilitate a scalable access control mechanism, in accordance with an embodiment of this disclosure. In some examples, one or more embodiments of process flow 1000 can be implemented by scalable access control component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 depicts receiving a query that identifies a user account and a resource, and wherein the query indicates querying whether the user account is authorized to access the resource. In some examples, operation 1004 can be implemented in a similar manner as operation 608 of FIG. 6.

After operation 1004, process flow 1000 moves to operation 1006.

Operation 1006 depicts determining, from a database that stores first associations between subjects and first attributes, user attributes that correspond to the user account, and resource attributes that correspond to the resource. In some examples, operation 1006 can be implemented in a similar manner as operations 604-606 of FIG. 6.

In some examples, operation 1006 is performed via a single row access of the database, and independently of performing a second row access of the database. That is, in some examples, both searching for whether a user is a member of a group and searching for groups where a user is a member can be performed by a single row access in a database.

In some examples, the user account is configured to be associated with contexts, wherein the user account is currently associated with a first context of the contexts, and the determining, from the database, of the user attributes that correspond to the user account, and the resource attributes that correspond to the resource is performed based on the first context. That is, an attribute-based access control system can select subject, object, and organization relationship data based on input information and context information.

After operation 1006, process flow 1000 moves to operation 1008.

Operation 1008 depicts determining, from the user attributes and resource attributes and from a context in which the query was initiated, first permissions for the user account with respect to the resource and given the context, and second permissions that enable access to the resource given the context. In some examples, operation 1008 can be implemented in a similar manner as operations 610-612 of FIG. 6.

In some examples, the determining of the first permissions and the second permissions is performed based on a policy. That is, these permissions can be determined based on policies, roles, permissions, and groupings 514 of FIG. 5.

In some examples, the subjects comprise user accounts, and the first attributes comprise third permissions, roles, or groups. In some examples, the database identifies organizations associated with the user accounts. In some examples, the determining of the first permissions in operation 1008 is based on the organizations. That is, a schema of data store and resource model 510 of FIG. 5 can be used. Third permissions, roles, or groups, as well as organizations can be stored in organizations, accounts, groups, and users hierarchy 512 of FIG. 5.

After operation 1008, process flow 1000 moves to operation 1010.

Operation 1010 depicts determining, based on the first permissions and the second permissions, whether to approve the query. In some examples, operation 1010 can be implemented in a similar manner as operation 614 of FIG. 6.

After operation 1010, process flow 1000 moves to operation 1012.

Operation 1012 depicts responding to the query based on the determining whether to approve the query. In some examples, operation 1012 can be implemented in a similar manner as operation 614 of FIG. 6.

After operation 1012, process flow 1000 moves to 1014, where process flow 1000 ends.

Figure 11:
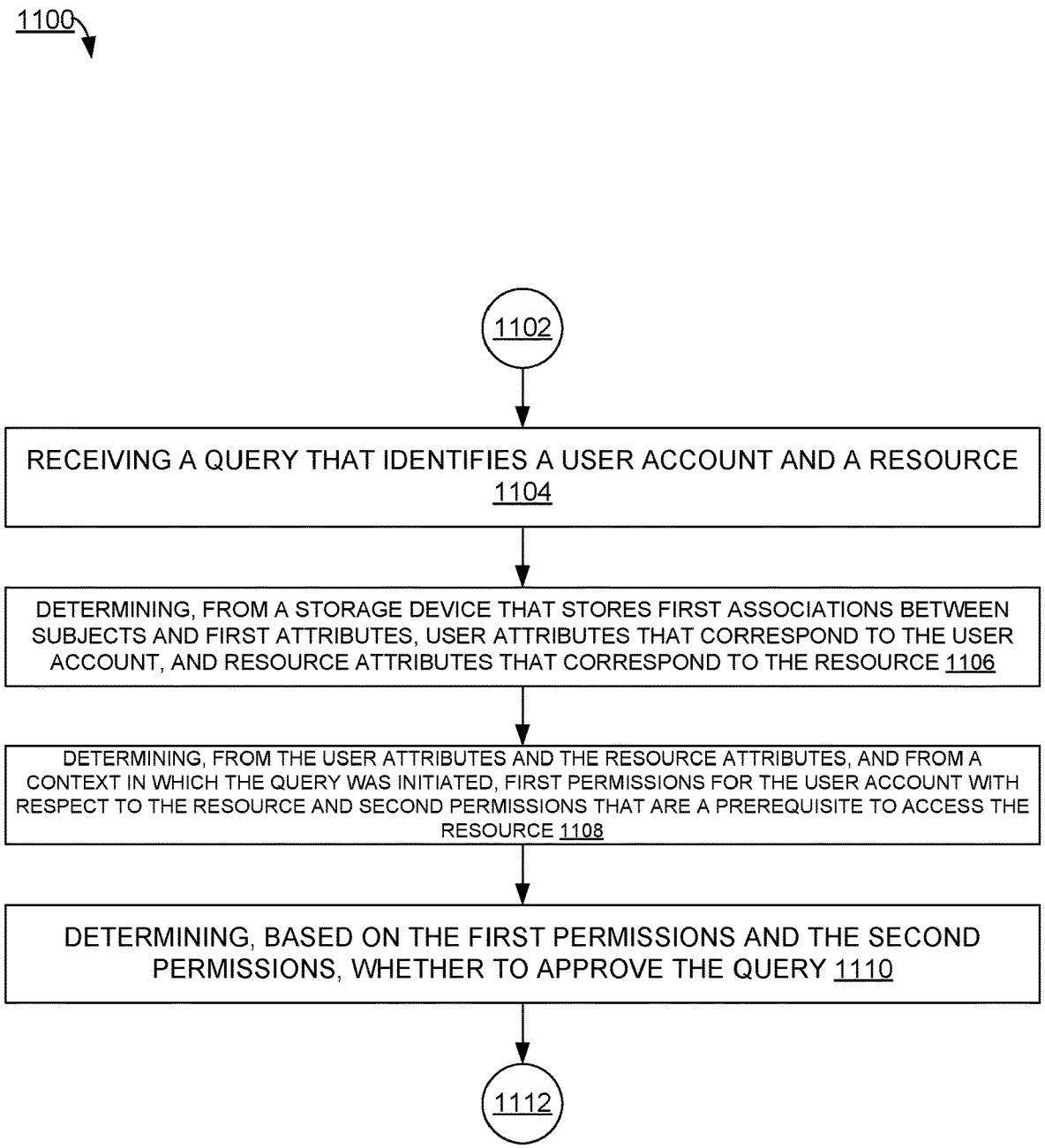
FIG. 11 illustrates another example process flow that can facilitate a scalable access control mechanism, in accordance with an embodiment of this disclosure.

FIG. 11 illustrates an example process flow 1100 that can facilitate a scalable access control mechanism, in accordance with an embodiment of this disclosure. In some examples, one or more embodiments of process flow 1100 can be implemented by scalable access control component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104. Operation 1104 depicts receiving a query that identifies a user account and a resource. In some examples, operation 1104 can be implemented in a similar manner as operation 1004 of FIG. 10.

In some examples, the query indicates a request associated with the user account to access the resource.

In some examples, the query is processed according to an attribute-based access control protocol. That is, attribute-based access control system 508 of FIG. 5 can implement an attribute-based access control protocol in processing the query.

After operation 1104, process flow 1000 moves to operation 1106.

Operation 1106 depicts determining, from a storage device that stores first associations between subjects and first attributes, user attributes that correspond to the user account, and resource attributes that correspond to the resource. In some examples, operation 1106 can be implemented in a similar manner as operation 1006 of FIG. 10.

In some examples, the subjects comprise at least one of software assets, virtual assets, subscriptions, services, workloads, or hardware assets, and wherein the subjects comprise the resource. In some examples, the storage device identifies organizations associated with the subjects. In some examples, determining the second permissions in operation 1108 is based on the organizations. That is, using the example of FIG. 5, data store and resource model 510 can store various types of information.

After operation 1106, process flow 1000 moves to operation 1108.

Operation 1108 depicts determining, from the user attributes and the resource attributes, and from a context in which the query was initiated, first permissions for the user account with respect to the resource and second permissions that are a prerequisite to access the resource. In some examples, operation 1108 can be implemented in a similar manner as operation 1008 of FIG. 10.

After operation 1108, process flow 1000 moves to operation 1110.

Operation 1110 depicts determining, based on the first permissions and the second permissions, whether to approve the query. In some examples, operation 1110 can be implemented in a similar manner as operation 1010 of FIG. 10.

After operation 1110, process flow 1000 moves to 1112, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of server 102, communications network 104, and/or client computer 106.

In some examples, computing environment 1200 can implement one or more embodiments of the process flows of FIGS. 6-11 to facilitate a scalable access control mechanism.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory coupled to the at least one processor, comprising instructions that cause the processor to perform operations comprising:
        maintaining a first data store that stores first associations between subjects and first attributes;
        maintaining a second data store that stores second associations between second attributes and permissions;
        receiving a query that identifies a user account and a resource, wherein the query indicates querying whether the user account has permission to access the resource;
        determining, from a first filtering of the first data store and a context of the user account in initiating the query, a first scope-based access control result of first permissions for the user account with respect to the resource and given the context;
        determining, from a second filtering of the second data store and the context of the user account in initiating the query, a second scope-based access control result of second permissions that are a precondition to access the resource given the context;
        determining, a role-based access control result based on the first permissions indicating that the user account satisfies the second permissions with respect to accessing the resource given the context, wherein the role-based access control result indicates whether to approve the query; and
        approving or denying the query based on the role-based access control result.

2. The system of claim 1, wherein the first data store is configured as part of an organization and resource model process.

3. The system of claim 1, wherein the second data store is configured as part of a scope-based access control process.

4. The system of claim 1, wherein the determining the role-based access control result is performed as part of a role-based access control process.

5. The system of claim 1, wherein the user account is a first user account, and wherein the operations further comprise:
    as one data store access of the first data store,
        adding a second user account to the first data store, and
        adding the second user account to at least one group in the first data store.

6. The system of claim 1, wherein the user account is a first user account, and wherein the operations further comprise:
    as one data store access of the first data store,
        removing a second user account from at least one group in the first data store, and
        removing the second user account from the first data store.

7. The system of claim 1, wherein the user account is a first user account, and wherein the operations further comprise:
    in response to determining that a second user account is associated with new responsibilities, and as one data store access of the first data store, removing the second user account from a first group in the first data store, and from a second group in the first data store.

8. A method, comprising:
    receiving, by a system comprising at least one processor, a query that identifies a user account and a resource, and wherein the query indicates querying whether the user account is authorized to access the resource;
    determining, by the system and from a filtering of a database that stores first associations between subjects and first attributes, a first scope-based access control result of user attributes that correspond to the user account, and resource attributes that correspond to the resource;
    determining, by the system and from the user attributes and resource attributes and from a context in which the query was initiated, a first scope-based access control result of first permissions for the user account with respect to the resource and given the context, and second permissions that enable access to the resource given the context;

determining, by the system and based on the first permissions and the second permissions, a role-based access control result indicating that the user account satisfies the second permissions with respect to accessing the resource given the context, wherein the role-based access control result indicates whether to approve the query; and approving or denying, by the system, the query based on the role-based access control result.

9. The method of claim 8, wherein the determining, from the database that stores the first associations between the subjects and the first attributes, of the user attributes that correspond to the user account, and the resource attributes that correspond to the resource is performed via a single row access of the database, and independently of performing a second row access of the database.

10. The method of claim 8, wherein the user account is configured to be associated with contexts, wherein the user account is currently associated with a first context of the contexts, and wherein the determining, from the database, of the user attributes that correspond to the user account, and the resource attributes that correspond to the resource is performed based on the first context.

11. The method of claim 8, wherein the determining, from the database, of the first permissions and the second permissions is performed based on a policy.

12. The method of claim 8, wherein the subjects comprise user accounts, and wherein the first attributes comprise third permissions, roles, or groups.

13. The method of claim 12, wherein the database identifies organizations associated with the user accounts.

14. The method of claim 13, wherein the determining of the first permissions is based on the organizations.

15. A non-transitory computer-readable medium comprising instructions that, in response to execution, cause a system comprising at least one processor to perform operations, comprising:

receiving a query that identifies a user account and a resource;

determining, from a first filtering of a storage device that stores first associations between subjects and first attributes, a first scope-based access control result of user attributes that correspond to the user account, and resource attributes that correspond to the resource;

determining, from a second filtering of the user attributes and the resource attributes, and from a context in which the query was initiated, a second scope-based access control result of first permissions for the user account with respect to the resource and second permissions that are a prerequisite to access the resource;

determining, based on the first permissions and the second permissions, a role-based access control result that indicates whether to approve the query; and approving or denying the role-based access control result that indicates whether to approve the query.

16. The non-transitory computer-readable medium of claim 15, wherein the subjects comprise at least one of software assets, virtual assets, subscriptions, services, workloads, or hardware assets, and wherein the subjects comprise the resource.

17. The non-transitory computer-readable medium of claim 16, wherein the storage device identifies organizations associated with the subjects.

18. The non-transitory computer-readable medium of claim 17, wherein the determining of the second permissions is based on the organizations.

19. The non-transitory computer-readable medium of claim 15, wherein the query indicates a request associated with the user account to access the resource.

20. The non-transitory computer-readable medium of claim 15, wherein the query is processed according to an attribute-based access control protocol.

\* \* \* \* \*